United States Patent

[11] 3,614,408

| [72] | Inventors | Brian L. H. Watkin;<br>Norman Evans; Ronald J. K. Arnold, all of<br>Sunbury-on-Thames, Middlesex, England |
|---|---|---|
| [21] | Appl. No. | 800,907 |
| [22] | Filed | Feb. 20, 1969 |
| [45] | Patented | Oct. 19, 1971 |
| [73] | Assignee | The British Petroleum Company Limited<br>Moor Lane, London, England |

[54] WAVEFORM ANALYZING SYSTEM, PARTICULARLY FOR CHROMATOGRAPHS, WHEREIN THE WAVEFORM IS INTEGRATED BETWEEN SELECTED PEAKS AND VALLEYS
10 Claims, 5 Drawing Figs.

[52] U.S. Cl. .................................................. 235/183,
235/181, 235/151.35, 324/77
[51] Int. Cl. ......................................................... G06g 7/18,
G06g 7/19
[50] Field of Search .......................................... 235/181,
183, 193, 151.35; 324/77

[56] References Cited
UNITED STATES PATENTS

| 3,118,057 | 1/1964 | Sill et al. ....................... | 235/183 |
| 3,242,327 | 3/1966 | Burk et al. .................... | 235/183 |
| 3,259,733 | 7/1966 | Klauer et al. ................. | 235/183 X |
| 3,412,241 | 11/1968 | Spence et al................... | 235/183 |
| 3,470,367 | 9/1969 | Frisby et al. .................. | 235/183 |
| 3,488,480 | 1/1970 | Stacy............................ | 235/183 X |

*Primary Examiner*—Malcolm A. Morrison
*Assistant Examiner*—Joseph F. Ruggiero
*Attorney*—Morgan, Finnegan, Durham & Pine ABSTRACT: A waveform analyzing system, particularly for use with chromatographs, wherein the waveform is integrated between selected peaks and valleys thereof, wherein a recycling timing device is used to reset the time scale to zero at selected points of the waveform, and wherein printout of the integrated values can be obtained at selected peaks and/or valleys of the waveform.

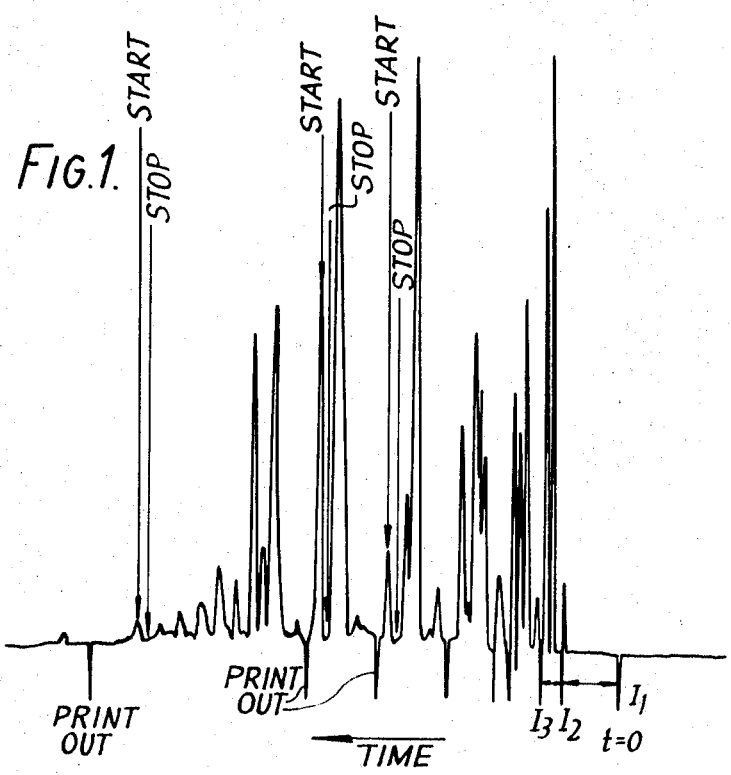
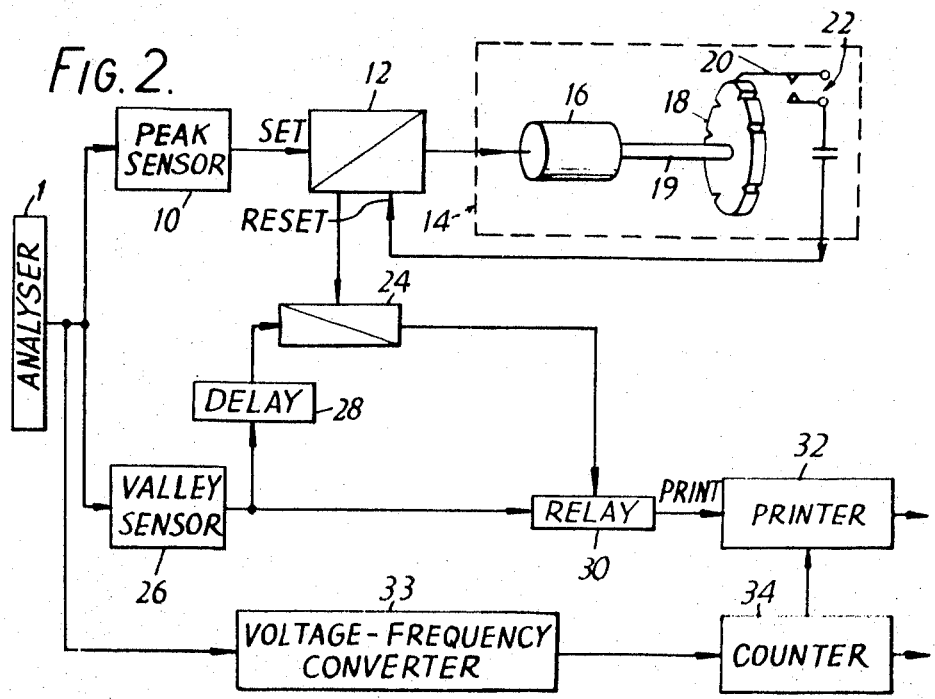

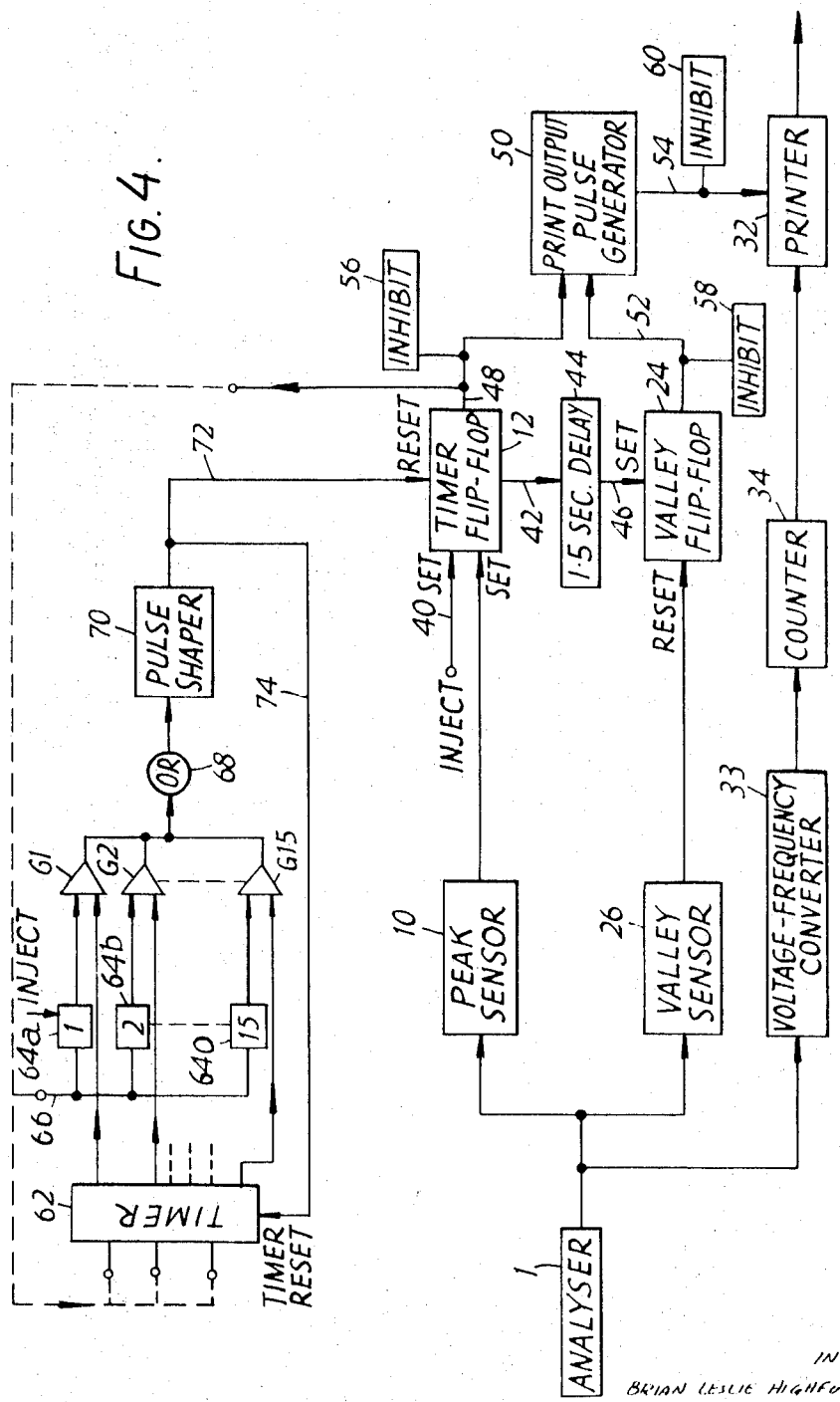

WAVEFORM ANALYZING SYSTEM, PARTICULARLY FOR CHROMATOGRAPHS, WHEREIN THE WAVEFORM IS INTEGRATED BETWEEN SELECTED PEAKS AND VALLEYS

This invention relates to waveform analyzing systems, and has particular application to process chromatographs and the analysis of chromatograms therefrom.

The analyzing system of the present invention has been developed particularly for the analysis of refinery gases and gasoline blended streams having a large number of constituents. However, it is not limited to this particular application or to use with the type of spike waveform associated with chromatographic recordings, and in fact it has general application to the analysis of varying amplitude waveforms of any nature occuring from any source.

The invention constitutes an improvement and variation over systems described and claimed in copending application Ser. No. 800,897, filed on Feb. 20, 1969 by Brian L. H. Watkin et al. Specifically, as disclosed in each of the applications, the present invention is directed to different readout control means and improved timing means used in waveform analyzing systems of the type described below.

In chromatographic analysis a sample to be analyzed is injected into a chromatographic column which acts to separate the various constituents of the sample. The elution times of the constituents differ due to selective adsorption and desorption, and therefore a graphical recording of the output from the column with respect to time provides an indication of the composition of the sample with the peaks of the waveform representing individual components.

It is often desired to integrate the column output waveform between selected points of the waveform to provide a measure of particular band components. Systems using a programmed timing control device which operates from a given time instant at the beginning of an elution cycle to define each of the integration limits throughout the whole analysis are known. However, with such systems errors will arise in the positioning of the limits of integration if there is any variation in the period of the elution cycle of succeeding sample analyses or indeed any variation during the course of any one sample analysis. Since elution times of the order of 30 to 40 minutes are not uncommon with individual peaks sometimes spaced by only a few seconds it will be clearly apparent that even a small variation in the overall elution period may cause errors in integration between fixed limits defined with reference to the beginning of the elution cycle. Such variations may be due to changes in the carrier gas flow rate, variations in the temperature program, and variations in the vapor pressure, for example.

It is an object of the present invention to provide a waveform analyzing system using a timing control which avoids the occurrence of any such cumulative errors due to time variations in successive analyses.

It is also an object of the present invention to provide a waveform analyzing system wherein integration or another mathematical operation is performed on a waveform between selected characteristic points thereof using these or a plurality of other characteristic points on the waveform as recycling zero time markers instead of operating relative to a continuously running time scale defined by a single point at the beginning of the waveform.

In accordance with the present invention there is provided a waveform analyzing system comprising sensing means arranged to receive a waveform of varying amplitude and to detect a recurring characteristic point of the waveform, a bistable device connected to said sensing means and arranged to be switched from a first state to a second state by the detection of a characteristic point by said sensing means, a recycling timing device arranged to be started by the switching of said bistable device to said second state and programmed to stop after a preselected time period, thereby switching said bistable device to its first state in readiness for the detection of the next characteristic point which restarts the timing device for a further preselected time period, and integrating means arranged to provide a measure of the area of the waveform between selected points thereof.

The sensing means is preferably a peak detector and said characteristic points are the maxima of the waveform.

The system also preferably includes a valley sensor arranged to receive said waveform and provide an output pulse at each waveform minimum.

In one embodiment the system is adapted for the integration of a peaked waveform between selected valleys thereof and includes printout means connected to said integrating means and controlled as to its printout times by said valley sensor and said bistable device, wherein said timing device is arranged to start at the occurrence of the last peak in each integration period defined by said selected valleys and is programmed to stop during the valley preceding each said selected valley, and wherein said printout means is arranged to printout at the occurrence of the first valley after each starting of the timing device.

In another embodiment the system is adapted for the integration of a peaked waveform between selected peaks and valleys thereof and includes printout means connected to said integrating means and controlled as to its printout times by said peak sensor, said valley sensor and said bistable device, wherein said timing device is arranged to start at the occurrence of selected peaks of the waveform and is programmed to stop during the valley preceding the next selected peak, and whereby said printout means is arranged to printout at the occurrence at each of said selected peaks and at the occurrence of the first valley after each of the said selected peaks.

In order that the invention may be more fully understood two embodiments thereof as applied to chromatographic analysis will now be described by way of example and with reference to the accompanying drawings, in which:

FIG. 1 is a graphical representation of a typical peaked waveform illustrating the application of the timing sequence thereto;

FIG. 2 is a schematic diagram of a first embodiment of waveform analyzing system of the present invention;

FIG. 4 is a schematic diagram of a second embodiment of waveform analyzing system of the present invention; and, FIG. 5 is a waveform illustrating the sequence of operations of the system of FIG. 4.

Referring first to FIG. 1 this shows a typical chromatogram waveform with the individual peaks representing different constituents in the sample. An analysis of the waveform between specific limits may require an integration of the waveform between specific limits. Such integration limits are indicated in FIG. 1 by downwardly depending marker lines $l_1$, $l_2$, $l_3$, etc. at certain selected valleys of the waveform only some of the marker lines being specifically referenced. There may be for example 13 such limits defining 12 sequential integration periods, extending over a total time period of, for example, of the order of 40 minutes. As mentioned above, any variation in the overall elution time between successive samples, or during the course of any one sample analysis, will cause a time displacement of the individual peaks relative to the start of the cycle, particularly towards the end of the cycle, and this might cause certain peaks to fall into the wrong integration period if the integration period limits are all timed from a fixed instant at the start of the cycle.

Figure 3:
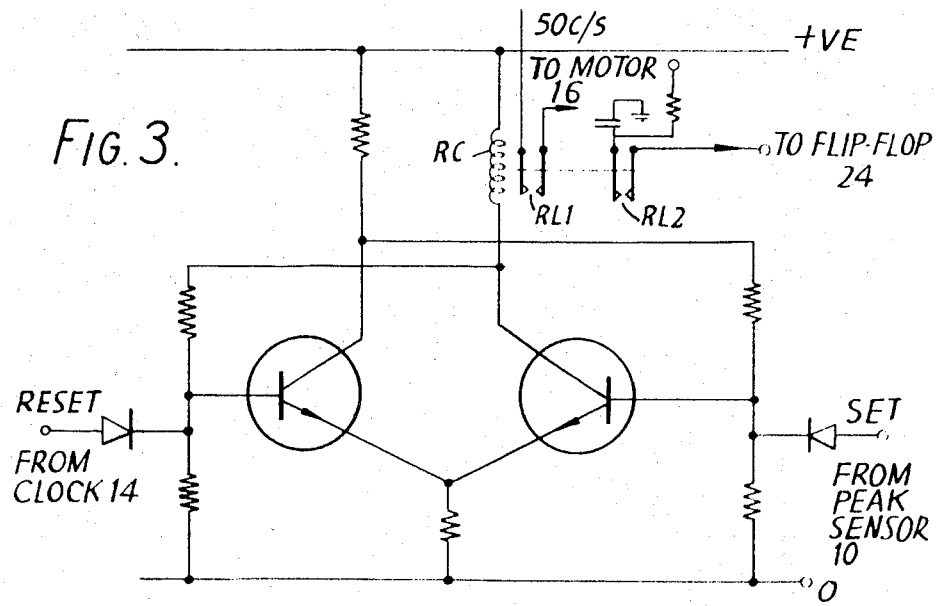
FIG. 3 is a circuit diagram of a bistable circuit for use in the system of FIG. 2.

FIG. 2 shows schematically a waveform analyzing system which overcomes this difficulty by recycling the timing mechanism to zero at spaced intervals during the cycle, in fact at least once in each integration period. Associated with the chromatograph column is an analyzer 1 which provides a peaked output voltage waveform as shown in FIG. 1. A peak sensor 10 monitors the waveform and provides an output pulse on the occurrence of each peak. These pulses serve as one input (set) to a bistable trigger circuit or timer flip-flop 12. The system also includes a clock mechanism indicated generally at 14 which in the embodiment shown comprises a synchronous motor 16 driven from a constant frequency supply, and a motor-driven cam 18 coupled to the motor by a drive shaft 19. The cam 18 is provided with a plurality of peripheral notches which are arranged to engage with a sensing arm 20 and which are spaced at selected annular settings to correspond to the desired integration periods. A switch 22 is actuated by the sensing arm 20 and is connected via a condenser to the other input of the timer flip-flop 12. As shown in FIG. 3 the timer flip-flop circuit 12 includes a pair of common-emitter transistors and a relay having a coil RC and two sets of contacts RL1 and RL2, one RL1 connected to the synchronous motor 16 and the other RL2 connected to the one input (set) of a valley flip-flop 24 (FIG. 2). The other input (reset) to the valley flip-flop 24 comes from a valley sensor 26 associated with the analyzer 1 via a delay network 28. The output of the valley flip-flop 24 controls a relay 30 which is connected into a direct line between the valley sensor 26 and the printer 32. The output from the analyzer 1 is also fed to a voltage-to-frequency converter 33 and then to a counter 34 coupled to the printer 32. The converter 33 produces a fluctuating output signal comprising a series of pulses at a frequency proportional to the amplitude of the converter input voltage. The counter 34 can then be a binary counter.

In operation, the peak sensor 10 detects the first peak of the output waveform and sends a pulse to the timer flip-flop 12, thus causing it to change to its "set" state. This closes the relay contacts RL1 (FIG. 3) in the flip-flop circuit and permits a continuous AC signal to be transmitted to the synchronous motor 16 to cause rotation of the cam 18 to begin and the timer mechanism to start to run. Simultaneously, a signal pulse is passed to the valley flip-flop 24 to switch it to its "set" state and energize relay 30 so that the valley sensor 26 is directly connected to the printer 32. Then, as soon as the next valley is detected by valley sensor 26 a "print" signal goes to the printer 32 to cause printout of the count state in the counter 34. The detection of this valley also causes a signal to be passed via the delay 28, which may be for example of the order of 3 seconds, to the valley flip-flop 24 to turn it to its "reset" state and deenergize relay 30 so that subsequent valleys detected by the sensor 26 do not actuate the printer 32.

Meanwhile the cam 18 of the timing mechanism 14 is being rotated by the motor 16 and, naturally, any further peaks which are detected by the peak sensor 10 will have no effect since the timer flip-flop 12 is already "set". When a programmed interval defined by the cam notches has elapsed and the sensing arm 20 drops into a notch the switch 22 is closed and a pulse is generated by the associated condenser which acts as a "reset" pulse for the timer flip-flop 12 and causes it to change to its "reset" state. The motor 16 consequently stops. The cam notches are positioned so that the timing mechanism motor stops during the valley preceding the last peak in a selected integration period (FIG. 1). When the next peak is detected, i.e. the last peak in an integration period, this will "set" the timer flip-flop 12 and restart the motor and cam constituting the clock, and will also "set" the valley flip-flop 24 to permit printout at the detection of the next valley. The printed-out value will therefore represent the integral of the waveform since the preceding printout point.

This sequence of events is shown in FIG. 1 for two of the integration periods. Thus, since the clock is effectively recycled for each integration period and is successively restarted by the detection of the last peak in an integration period instead of being continuously running, any variation in the overall elution time will not effect the integration adversely.

In the event that a desired integrative period is so long that there is danger of a variation in the elution time over the length of the period itself an extra recycling operation can be carried out within the integration period in order to break down the times between recycling to intervals which are sufficiently short for no significant variation in the analysis conditions to occur. This can be done by using a second cam arranged coaxially with respect to the cam 18 and fixed relative thereto, by having further intermediate notches cut in the cam 18 to correspond to the extra recycling times, and by having wider notches formed in the second cam which extend peripherally on each side of the intermediate notches in the cam 18. A second sensing arm associated with the second cam is then used to engage these wider notches. Since in this arrangement one must ensure that the pulses from the switch 22 due to the intermediate notches in cam 18 do not actuate the valley flip-flop 24, or a false printout will follow, the action of the sensing arm of the second cam when it engages a notch therein is to inhibit the switching of the valley flip-flop 24 by shorting out the relay contacts RL2 associated therewith and shown in FIG. 3.

Although the timing mechanism 14 has been shown as comprising a synchronous motor 16 and cam 18, any equivalent device may be used. For example, instead of a sensing arm 20 and notches in the cam, a photoelectric sensing arrangement could be used.

The embodiment described above permits printout at preselected valleys in the analyzer waveform, and although this operates satisfactorily for many purposes it may be desirable to obtain more detailed information about the constituents in the sample under analysis and this requires a greater breakdown of the analyzer waveform.

FIG. 4 shows a second embodiment of waveform analyzing system in accordance with the invention which uses a more sophisticated timing mechanism and has the additional facility of permitting printout both at the valleys as indicated in FIG. 1 and also at the peaks preceding these selected valleys. This imparts a greater flexibility to the system and makes it easier to obtain an analysis of individual peaks. The timing mechanism of the second embodiment, as will be described in more detail below, consists of an electronic constant-rate counter controlled by the timer flip-flop and designed to generate timer flip-flop "reset" pulses at preselected count values.

In FIG. 4, certain components which have counterparts in the system of FIG. 2 are indicated by the same reference numerals. As in the preceding embodiment, the system includes an analyzer 1 feeding a peaked output waveform to a peak sensor 10 and a valley sensor 26, and to a voltage-to-frequency converter 33 which provides a train of pulses to a binary counter 34 at a frequency proportional to the instantaneous amplitude of the analyzer output waveform. A timer flip-flop 12 receives "set" pulses from the peak sensor 10 on the occurrence of each peak in the waveform and is also arranged to receive a "set" pulse on line 40 when the sample is injected into the chromatographic column and the elution cycle starts. The timer flip-flop 12 has an output line 42 to a 1.5 second delay circuit 44 which is connected by line 46 to the "set" input of the valley flip-flop 24. The timer flip-flop 12 has a second output line 48 which is connected to a print output pulse generator 50, this pulse generator also having an input lead 52 from the valley flip-flop 24. The output side of the pulse generator 50 is connected over line 54 to the printer 32. The leads 48, 52 and 54 from the timer flip-flop, the valley flip-flop, and the pulse generator 50 respectively, are connected to inhibit circuits 56, 58 and 60 respectively, the function of these being explained in more detail later.

The timing device of this system essentially comprises an electronic counter. The counter comprises a timer 62 having three inputs connected in common to the output line 48 from the timer flip-flop 12. In the present embodiment, by way of example, the sample analysis cycle is assumed to be divided into 15 sequential time periods and the function of the timing counter is to provide a "reset" pulse to the timer flip-flop 12 at the end of each of these programmed time intervals. The timing device includes 15 registers 64a, 64b ... 64o, with a common shift rail 66 connected to the output line 48 from the timer flip-flop 12. These registers comprise flip-flops and have their outputs connected to respective AND-gates G1, G2, ... G15. The second input to each of the gates G1, G2 etc. comes from the timer 62. The timer 62 includes programmable switch circuits which enable 15 time periods of different lengths to be set up corresponding to the desired integration bands in the chromatogram. Suppose for example that the first time period in the analysis cycle is 2 minutes 36 seconds, then this value is set up on the timer switches and after this present time has elapsed an output pulse will be generated and fed to the gate G1, the other input of which has already been set by the feeding of an injection pulse to the first register 64a. Therefore, after this period of 2 minutes 36 seconds there will be an output pulse from gate G1 which is fed through a common OR gate 68 connected to each of the gates G1, G2 etc. The output signal from the OR gate gate 68 is fed to a pulse shaper 70 which produces a pulse of approximately 2 seconds duration which is fed over line 72 to the timer flip-flop 12 as a "reset" pulse for the flip-flop. This 2 second pulse is also fed back over line 74 to the timer 62 to reset the switches for the next programmed time period.

It has been found in practice that increments of 2 seconds are sufficiently small to enable programmed time periods to be set up with sufficient accuracy. For ease of operation it has been found advantageous for the programmed time periods set up by the timer 62 to be composed of a combination of 1 minute, 10 second, and 2 second increments. By a suitable combination of these increments any desired time period can be set up on the timer 62 with a 2 second minimum increment.

In operation, the system shown in FIG. 4 uses the same basic principle as described in the first embodiment, i.e. the use of certain peaks in the waveform as recycling zero time markers so that the timing device restarts at the occurrence of these selected peaks rather than running continuously from an initial time instant at the beginning of the sample analysis.

Figure 5:
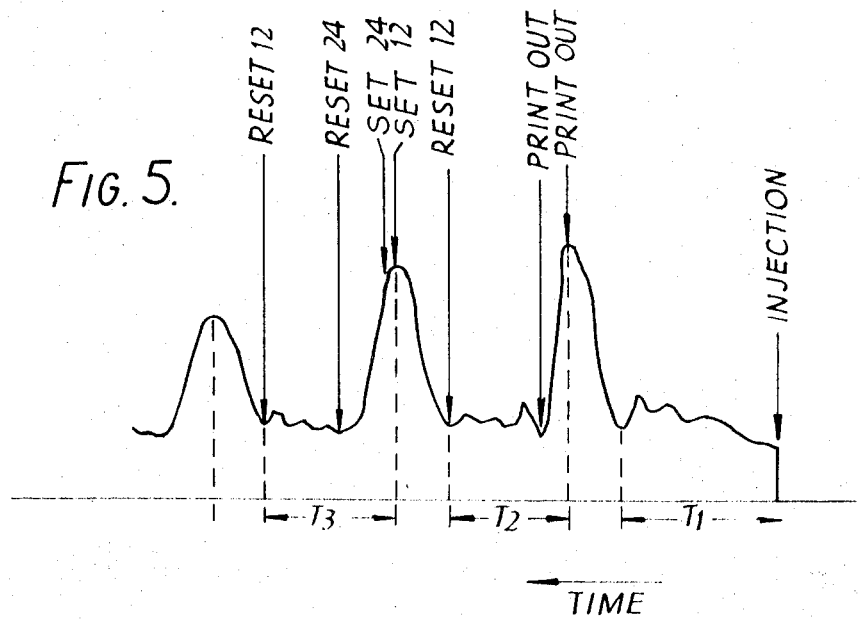

FIG. 5 illustrates the sequence of operation in the system shown in FIG. 4. From FIGS. 4 and 5 it will be seen that the analyzer 1 provides a continuous varying amplitude signal to the converter 33 which provides a pulse train to the counter 34 connected to the printer 32. On the injection of a sample into the chromatographic column a "set" pulse is applied on line 40 to the timer flip-flop 12 and the first register 64a in the timing device is set to provide an output to the gate G1. The timer 62 which has been programmed for a time period $T_1$ of, for example, 2 minutes 36 seconds, is also simultaneously energized and at the end of this preset time period $T_1$ the timer 62 provides a pulse output to the gate G1, resulting in a 2-second pulse on line 72 which acts to "reset" the timer flip-flop 12. The 2-second pulse on line 72 is also fed over line 74 to reset the timer 62 for the next programmed time period $T_2$. As mentioned above in connection with the first embodiment, the length of the time period $T_1$ is preselected so that it ends in the valley preceding the last peak of an integration period.

When the peak sensor 10 detects the next peak in the waveform it will provide a "set" pulse to the timer flip-flop 12 and this will result in output pulses on lines 42 and 48. The pulse on line 48 is fed to the print output pulse generator 50 with consequent printout of the counter value by the printer 32. The pulse on line 48 is also fed back to the inputs of the timer 62 to restart the timer for the next programmed time period $T_2$ and it simultaneously effects a shift in the registers 64a, 64b, etc. via the shift rail 66 so that the second gate G2 has its one input energized. The output from the timer flip-flop 12 on line 42 passes via the 1.5 second delay circuit 44 to "set" the valley flip-flop 24. When the valley sensor 26 detects the next valley in the waveform it transmits a pulse to "reset" the valley flip-flop 24, which causes an output pulse therefrom to be passed over line 52 to the print output pulse generator 50. This again causes printout of the counter value at this valley point.

This procedure continues through the successive time periods $T_1$, $T_2$, etc. with the recycling timing mechanism restarting at each of the peaks following the resetting of the timer flip-flop 12, and with printout of the count state both at these peaks and at the immediately following valleys.

By initiating printout at these selected peaks and valleys of the waveform it is possible to obtain an integrated value of the area under a smaller portion of the waveform than is possible with the system of FIG. 2, and in particular it is possible to obtain the integral of the area under one-half of a selected peak. The area of such a peak, and hence the proportion of this constituent in the sample under analysis, is thus determined to a considerable degree of accuracy.

As mentioned above, the system shown in FIG. 4 includes inhibit circuits 56 58 and 60 by means of which it is possible to inhibit the printout even though a pulse is present on one of the lines 48, 52 and 54. Thus, if it is desired to obtain a measure of the area under a broader band of the waveform covering several constituents in the sample, the inhibit peak printout circuit 56 and/or the inhibit valley printout circuit 58 can be used. In this way the accuracy of the analyzing system inherent in the recycling timing mechanism is accompanied by an increased flexibility in the positions at which printout can occur, thus making it possible to carry out a detailed analysis of selected parts of the waveform.

We claim:

1. A waveform analyzing system for processing a waveform of fluctuating amplitude between limits defining a plurality of processing periods, comprising: peak sensor means for providing a trigger signal in response to the occurrence of a peak of the waveform, a valley sensor for providing an output pulse in response to the occurrence of a valley of the waveform, timing means responsive to the trigger signal for providing to the peak sensor means an indication of the elapse thereafter of a programmed time interval, the peak sensor means being unresponsive to the waveform during the programmed time interval and being rendered responsive by the timing means indication, processing means receiving the waveform, and controllable readout means connected to the processing means to provide an output indicative of the processed waveform, the readout means being responsive to the trigger signal and to each output pulse following the occurrence of a trigger signal whereby the processing periods are defined between detected successive peaks and valleys, selected periods of which are at least equal to the programmed time interval.

2. A waveform analyzing system of claim 1, wherein the peak sensor means includes a first bistable device switchable from a first state to a second state in response to the occurrence of a waveform peak, and from the second state to the first state in response to the timing means indication.

3. A waveform analyzing system as claimed in claim 2, which includes a second bistable device transferable from a first state to a second state in response to the second state of the first bistable device, and transferable from the second state to the first state in response to the valley sensor output pulse, the second bistable device controlling the readout means upon coincidence of such second state and an output pulse thereat.

4. A waveform analyzing system as claimed in claim 3, which includes controllable readout inhibit circuits connected to the first and second bistable devices to inhibit operation of the readout means in response thereto at certain of the selected peaks and valleys.

5. A waveform analyzing system as claimed in claim 3, which includes means connected to said first bistable device to delay application of the trigger signal to the second bistable device.

6. A waveform analyzing system as claimed in claim 2, in which said timing means comprises an electronic counting mechanism arranged to generate pulses to switch said first bistable device to its first state at its first state at preselected count values.

7. A waveform analyzing system as claimed in claim 6, in which said counting mechanism comprises timer switches connected to input clock lines, a plurality of shift registers equal in number to the number of selected integration periods and having a shift rail excited by the trigger signal, and an equal plurality of coincidence gating means connected to said shift registers and to said timer switches to provide the programmed time interval indication to said first bistable device.

8. A waveform analyzing system as claimed in claim 2, in which said processing means comprises a voltage-to-frequency converter responsive to said peaked waveform, and a counter connected to the output of said converter to receive a pulse train therefrom whose frequency is proportional to the instantaneous amplitude of said waveform, thereby to perform an integration operation on the waveform.

9. A waveform analyzing system as claimed in claim 2, which includes a chromatographic analyzer having its output connected to said peak sensor means and to said valley sensor.

10. A waveform analyzing system for integrating a waveform of fluctuating amplitude between limits defining a plurality of integration periods, comprising input means to which the waveform is applied; a peak maximum sensor connected to said input means to provide trigger signals in response to detection of the peak maxima of the waveform, a valley minimum sensor connected to said input means to provide output pulses in response to detection of the valley minima of the waveform, a bistable device connected to said peak maximum sensor to be switched from a first state to a second state by a trigger signal from said peak maximum sensor, recycling timing means connected to said bistable device and enabled for a programmed time interval on switching of said bistable device to its said second state, means conveying an indication of the end of each said programmed time interval to said bistable device to switch said bistable device to its said first state in readiness for the nest trigger signal, integrating means connected to receive said waveform from said input means, printout means connected to said integrating means, and means connecting said printout means to said valley minimum sensor and to said bistable device, said timing means being enabled at the occurrence of selected peak maxima of the waveform and programmed to stop during the valley preceding the next selected peak maxima, and said printout means being thereby controlled from the waveform to print out at the occurrence at each of said selected peak maxima and at the occurrence of the first valley minimum after each of said selected peak maxima.